United States Patent [19]

Kolensky et al.

[11] 4,122,301

[45] Oct. 24, 1978

[54] SELECTION OF BRANCH LINES OF MULTIPOINT JUNCTION CIRCUITS

[75] Inventors: Leo Michael Kolensky, Irvington; Walter Rudolph Schaefer, Wall Township, Monmouth County; Gabriel Gary Schlanger, West Orange; Allan Howard Willand, Loch Arbour, all of N.J.

[73] Assignee: Bell Telephone Laboratories, Incorporated, Murray Hill, N.J.

[21] Appl. No.: 865,432

[22] Filed: Dec. 29, 1977

[51] Int. Cl.² .................. H04H 9/00; H04L 25/20
[52] U.S. Cl. .................................. 178/73; 178/3; 178/69 G; 340/147 LP
[58] Field of Search .................. 179/15 BF, 175.31 R; 178/69 G, 69 R, 73, 3; 340/147 R, 147 LP, 151, 152; 325/31, 67

[56] References Cited

U.S. PATENT DOCUMENTS

| | | | |
|---|---|---|---|
| 3,869,573 | 3/1975 | Kolensky et al. | 178/73 |
| 3,883,690 | 5/1975 | Kolensky et al. | 178/73 |
| 3,883,691 | 5/1975 | Pilc et al. | 178/73 |
| 3,914,743 | 10/1975 | Fitch et al. | 340/147 R |
| 3,921,138 | 11/1975 | Burns et al. | 340/147 R |
| 4,048,441 | 9/1977 | Young | 178/73 |
| 4,055,808 | 10/1977 | Holsinger et al. | 178/69 G X |

*Primary Examiner*—Thomas A. Robinson
*Attorney, Agent, or Firm*—Roy C. Lipton

[57] ABSTRACT

A multipoint junction unit at a hub office interconnects a main line and a plurality of branch lines, the main line extending to a control station and the branch lines extending to data station line loops, to downstream local offices and to a main line of a multipoint junction unit in a downstream hub office. Normally, the junction unit broadcasts downstream data to all branches and combines upstream data from the branches for propagation up the main line. When a branch line is to be tested, test equipment connected to the upstream main line sends an address sequence to select an upstream branch and, if required, a second sequence to select a downstream branch, whereupon unselected branches are blocked and the selected branches are unblocked to permit passage of upstream and downstream data. The selected branch may thereafter be removed from the network by a "blocking" sequence which blocks the selected branch and restores all unselected branches. The upstream junction unit does not block its selected branch in response to the blocking sequence when a second address sequence has been sent to select a downstream branch.

7 Claims, 5 Drawing Figures

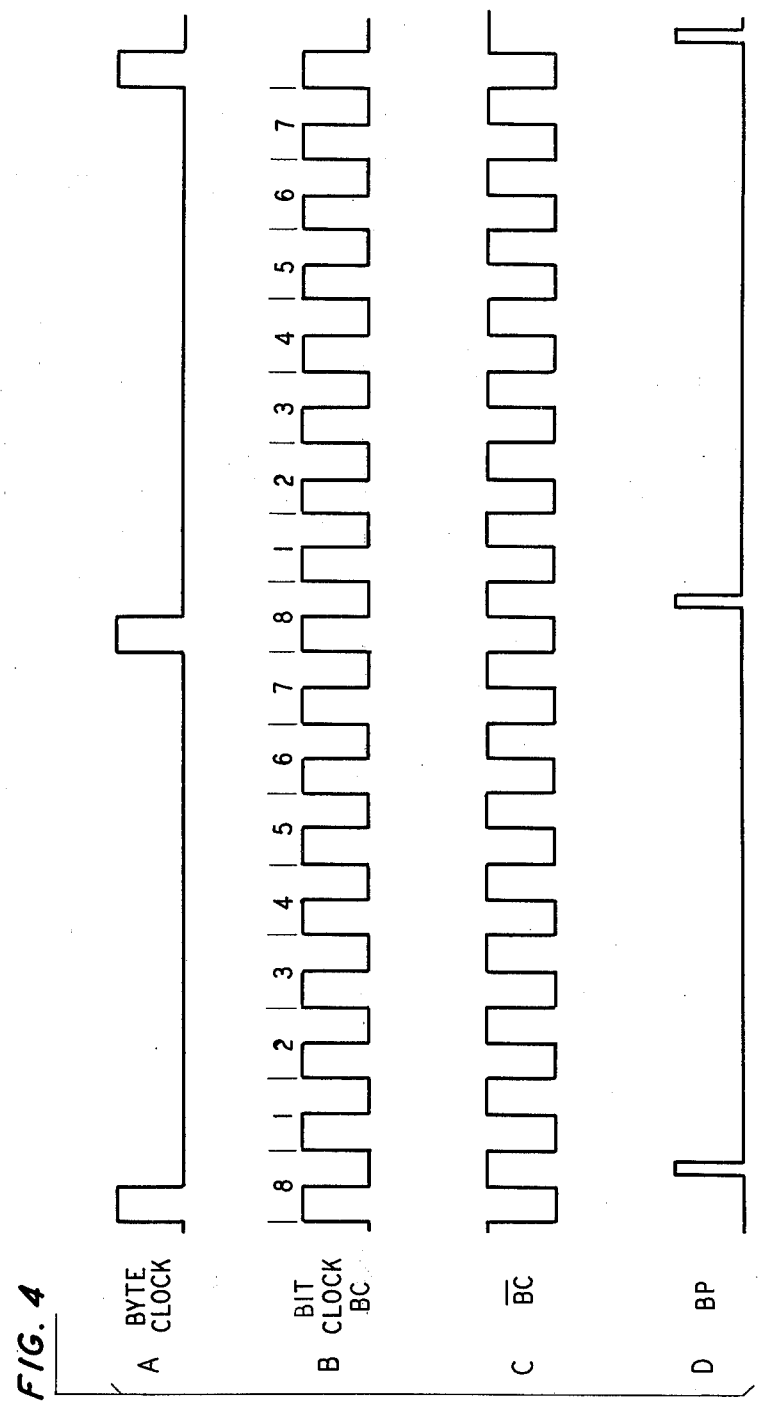

SELECTION OF BRANCH LINES OF MULTIPOINT JUNCTION CIRCUITS

FIELD OF THE INVENTION

This invention relates to data communication networks and, more particularly, to network hubs or junctions for broadcasting data from an upstream control location to downstream branch lines and for repeating data originating at downstream stations that terminate the branch lines to the upstream control location.

DESCRIPTION OF THE PRIOR ART

A private line data network shared in parallel by a plurality of line stations whose operations are controlled from a remote control station is known as a multipoint or party line. The control station is equipped with a master controller, such as a computer, which can communicate with any of the line stations, instructing the line stations to transmit messages to the computer station which stores and possibly processes the messages thus received from the sending line station and then possibly retransmits the messages to other stations on the multipoint network or on other multipoint networks that may be connected to the computer.

The computer station is connected via a main channel to a common carrier central office called a hub or junction office in which a unit called a multipoint junction unit splits the main channel into branch lines in the downstream direction towards the line stations. Signals from the computer station to the hub office are thus broadcast to all the branch lines for transmission to line stations, to other local offices or to other hub offices further downstream. In the latter case, the signal is split again to be broadcast to branch lines radiating from the downstream hub. In the upstream direction, transmission from each line station passes upstream to the branch line in the hub office where the signal is combined with signals on other branch lines and the resultant signals are propagated up to the main line extending to the computer station subject to the condition that only one line station at a time can send to the computer station.

It is conventional for the common carrier to provide appropriate administrative or housekeeping functions for the network, which functions include the detecting of trouble or out-of-service line conditions and the testing and managing of equipment in the network. Centrally located testing and signaling equipment is conveniently located on the main channel in the upstream hub office where it has the capability to communicate with all the branch lines in the network. Certain supervisory control signals are reserved for exclusive use by the common carrier for signaling these line and equipment conditions. If a branch line appears to be in trouble, by failing to communicate with the computer or by communicating improperly, an attendant at the upstream hub office, upon ascertaining that a line is in trouble, operates the hub office test equipment to send test signals downstream to the line, testing the equipment thereon, and displaying the responses from the tested equipment.

In U.S. Pat. No. 3,914,743, which issued to S. M. Fitch, L. M. Kolensky, J. C. Panek, D. C. Rife and W. R. Schaefer on Oct. 21, 1975, there is disclosed a multipoint network provided with multipoint junction units at the hubs. The junction units normally broadcast signals to downstream branches, combine upstream data signals and, to preclude the garbling of the upstream data by idle lines, block the upstream propagation of idle signals and other supervisory control signals. To test a line, the attendant sends a selection or address code sequence and, in response thereto, the upstream junction unit enters a test mode state to permit the upstream and downstream intercommunication of both data and supervisory control signals between the testing equipment and the branch selected by the address code sequence. At the same time, the upstream junction unit, in the test mode state, precludes intercommunication with the other unselected branch lines. If the line to be tested is a downstream branch, the attendant first selects the branch line extending to the downstream hub and then sends a second address code sequence to place the downstream junction unit in the test mode state and to select the downstream branch which is to be tested. After testing, a restoration signal returns the upstream and downstream units to their normal states.

It is sometimes determined, as a result of this testing, that a branch line should be taken out of the network. It is a broad object of this invention to enable the attendant to remove branch lines from the network without requiring assistance from personnel at the various junction units.

It is a further object of this invention to enable the attendant to remove downstream branches without affecting any other portion of the network, including the branch leading to the downstream hub.

SUMMARY OF THE INVENTION

In accordance with the objects of this invention, the junction unit, when in the test mode state, permits resumption of intercommunication with the unselected branch lines and removes the selected branch from the network by blocking intercommunication with the selected branch line if a control signal is applied to the main line by the attendant.

It is a feature of this invention that the upstream junction unit will not block its selected branch in response to the control signal if the attendant had sent a second address code sequence to select a downstream branch.

In accordance with a specific embodiment of this invention, disclosed herein, the attendant terminates the intercommunication blockage with the selected branch line by sending a restoration signal. The restoration signal includes the address code sequence or sequences that priorly selected the blocked branch line and a cancelling signal. The junction unit, in response to this restoration signal, restores to its normal state wherein signals on the main line are again broadcast to all branches and upstream data signals are combined for application to the main line.

The foregoing and other objects and features of this invention will be more fully understood from the following description of an illustrative embodiment taken in conjunction with the accompanying drawings.

BRIEF DESCRIPTION OF THE DRAWINGS

In the drawings,

FIG. 4 depicts timing waves representing outputs of various circuits in the junction unit.

DETAILED DESCRIPTION

Figure 1:
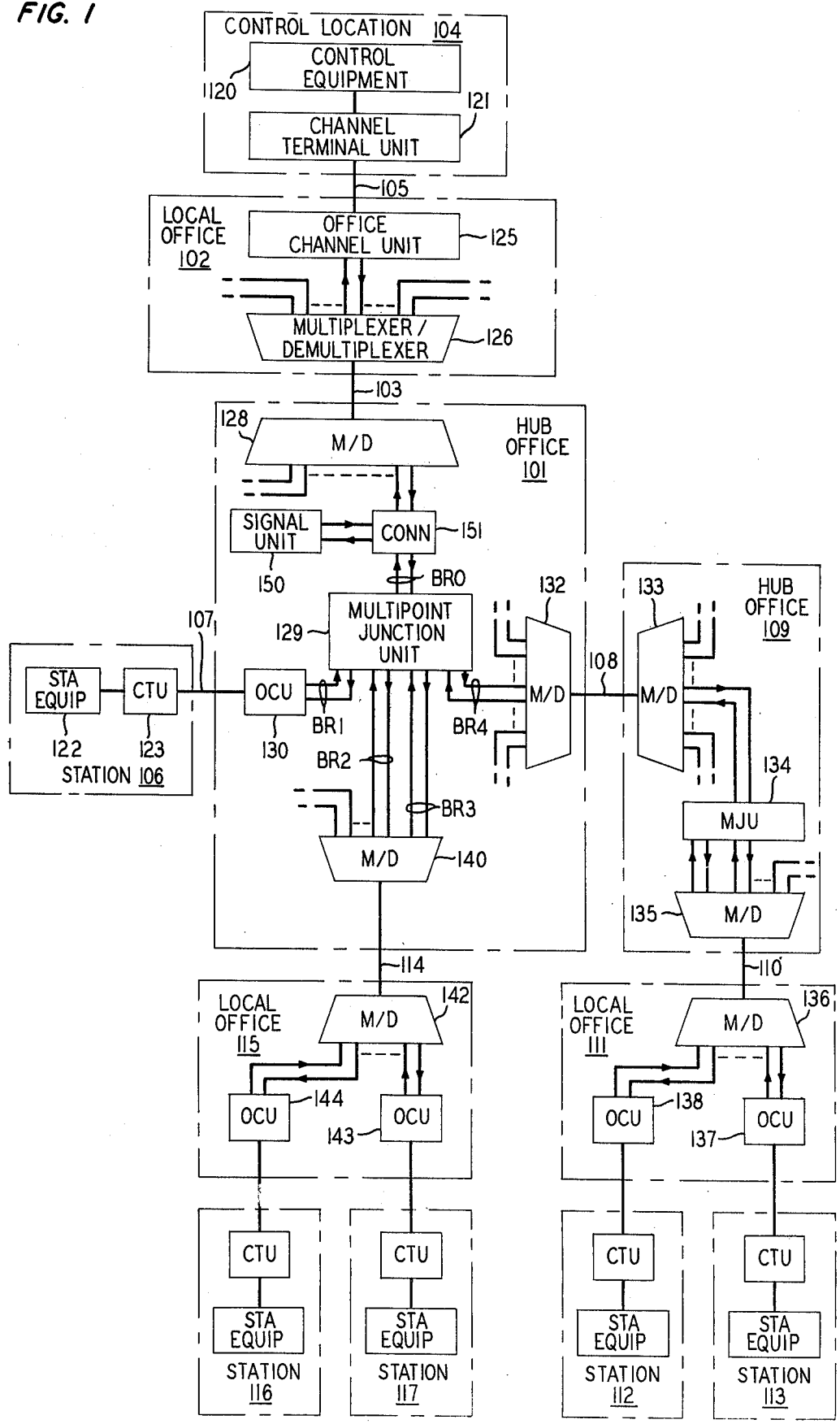
FIG. 1 discloses, in block form, various circuits and equipment which form a multipoint network.

The selective calling system as shown in FIG. 1 comprises control location 104, stations 106, 112, 113, 116 and 117 and an interconnecting network that interconnects control location 104 with the various stations. This interconnecting network includes hub offices 101 and 109 and local offices 102, 111 and 115. Control location 104 is connected to local office 102 over two-way line loop 105, which line loop is arranged to accommodate line signaling in both directions. Similarly, each of the stations is connected to a hub or local office by way of a line loop which accommodates similar duplex line signaling. The offices are interconnected by way of two-way transmission trunks, local office 102 being connected to hub office 101 by way of two-way transmission trunk 103. Hub office 101 is, in turn, interconnected to hub office 109 and local office 115 by way of two-way trunks 108 and 114, respectively. Similarly, hub office 109 is interconnected with local office 111 by way of two-way trunk 110.

In general, the network operates in one of two modes; namely, a "data" mode and a "test" mode. When the network is in the data mode, data originating from control location 104 is split in the hub offices and simultaneously broadcast downstream to all of the stations and, in the reverse direction, data originating from the several stations are combined in the hub offices and conveyed to control location 104, subject to the condition that a station cannot communicate with another station and two stations cannot transmit to control location 104 at the same time.

In the test mode, control of the network is assumed by signaling equipment in hub office 101 which, in cooperation with hub office 109, selects internal branches that interchange signals with the line loops and trunks that extend from the hub offices. Full duplex signaling may be provided in the test mode between the hub office 101 signaling equipment and the selected ones of the branches to the exclusion of unselected ones of the branches. In accordance with this invention, equipment in each hub office may also provide a control function in the test mode, which control function involves arranging for the blocking of selected ones of the branches. Under this latter condition, when the network is restored to the data mode, the data originating from control location 104 is simultaneously broadcast to the unblocked ones of the branches to the exclusion of the blocked ones of the branches.

Control location 104 generally consists of control equipment, indicated by block 120, and channel terminal unit 121. Control equipment 120 includes a data message transmitter (not shown) for sending data word messages to selected ones of the stations, a data message recorder (not shown) for receiving data word messages from selected ones of the stations, and control circuit equipment (not shown) for generating and sending selection words to start station transmitters and turn ON station recorders. The outgoing data and selection words are passed to channel terminal unit 121, which converts the words to line signals suitale for application to two-way loop 105. Channel terminal unit 121 also converts the incoming line signals on two-way loop 105 to data and selection words for application to control equipment 120.

Each station consists of station equipment and a channel terminal unit, such as station equipment generally indicated by block 122 and channel terminal unit 123 in station 106. A station transmitter for sending data word messages to the control location and a station recorder for receiving data word messages from the control location are included in the station equipment of each station. In addition, the station equipment includes circuit equipment for recognizing address words from the control location to start the station transmitter or turn ON the station recorder. The channel terminal unit in the station is arranged in substantially the same manner as channel terminal unit 121, converting locally generated data words to appropriate line signals for application to the station loop, such as loop 107, and for converting incoming line signals to corresponding data and address words.

Suitable control equipment for control location 104 and station equipment for each station, such as station 106, is disclosed in U.S. Pat. No. 3,427,588, issued to P. T. Mauzey, C. J. Votaw and H. M. Zydney on Feb. 11, 1969.

It is contemplated that the network constitutes part of a digital data system and the local and hub offices in the network are arranged to multiplex data on various incoming channels for application to outgoing trunks and to demultiplex data on incoming trunks for application to outgoing channels or for remultiplexing and application to outgoing trunks.

The first local office downstream from control location 104 is local office 102. Local office 102 includes office channel unit 125 and multiplexer-demultiplexer 126. Office channel unit 125 receives the data transmission from control location 104 and assembles the data into multibit bytes, writing an appropriate bit (such as a "1" bit) into the eighth bit position of the byte to denote that the byte comprises a data word (as opposed to a supervisory control byte which contains a "0" bit in the eighth bit position). The data byte is then fed into one port of multiplexer/demultiplexer 126 to be inserted into one time slot on trunk 103, while bytes from other office channel units (not shown) in local office 102 are applied to other input ports of multiplexer/demultiplexer 126 for insertion into other time slots on trunk 103. The multiplexed bytes are then transmitted downstream via trunk 103 to hub office 101.

The multiplexed bytes coming upstream from hub office 101 on trunk 103 are passed to multiplexer/demultiplexer 126, which distributes the bytes in each time slot to individual output ports, such as the port connected to the path extending to office channel unit 125. Office channel unit 125, in turn, strips off the eighth bit of the byte, disassembles the byte and applies the corresponding line signals to loop 105 for transmission upstream to location 104.

Although the specific circuitry for multiplexer/demultiplexer 126 and office channel unit 125 for providing the above-described functions may comprise many different well known arrangements, it is preferred that the circuitry be of the type disclosed in U.S. Pat. No. Re 29,215 issued May 10, 1977 to A. C. Carney, M. P. Cichetti, Jr., J. G. Kneuer and D. W. Rice.

The downstream data on trunk 103 from local office 102 is passed to multiplexer/demultiplexer 128 in hub office 101. Multiplexer/demultiplexer 128, which is arranged in substantially the same manner as multiplexer/demultiplexer 126, distributes the data to its various output ports, applying to each port the data byte in the time slot corresponding to the port. The data bytes from office channel unit 125 are therefore provided to one port of multiplexer/demultiplexer 128, which port is connected to connector 151 and connector 151, in turn, is normally arranged to pass the data bytes to main line BR0 of multipoint junction unit 129.

With respect to downstream data, and as described in detail hereinafter, it is normally the function of multipoint junction unit 129 to accept the data bytes coming downstream on main line BR0 and to simultaneously apply the data bytes to downstream paths of various branch lines; multipoint junction unit 129 having four branch lines designated branches BR1, BR2, BR3 and BR4. The data bytes on the downstream paths of the four branches are therefore simultaneously applied to office channel unit 130, an input port of multiplexer/demultiplexer 132 and two input ports of multiplexer/demultiplexer 140. The downstream data bytes on branch BR1 are converted to appropriate line signals by office channel unit 130 and passed by way of loop 107 to station 106. Data bytes on the downstream paths of branches BR2 and BR3 are multiplexed by multiplexer/demultiplexer 140, data bytes on branch BR2 being applied to one time slot and data bytes on branch BR3 being applied to another time slot on two-way trunk 114 for passage downstream to local office 115. Data bytes on the downstream path of branch BR4 are inserted in a time slot of two-way trunk 108 by multiplexer/demultiplexer 132 for passage downstream to hub office 109.

With respect to transmission in the other or upstream direction, line signals from station 106, for example, are passed via line 107 to hub office 101 where they are converted to data bytes by office channel unit 130 and passed to the upstream path of branch BR1. Data bytes coming upstream in two of the time slots on trunk 114 are distributed to two ports of multiplexer/demultiplexer 140 connected to the upstream paths of branches BR2 and BR3. Data bytes coming upstream in one of the time slots on trunk 108 are applied to an output port of multiplexer/demultiplexer 132 connected to the upstream path of branch BR4. The data on these upstream paths of the several branches are combined by multipoint junction unit 129 and applied via the upstream path of main line BR0 to connector 151. Connector 151 is normally arranged to apply these data bytes to an input port of multiplexer/demultiplexer 128. These data bytes, in turn, are inserted in a time slot on trunk 103, transmitted upstream to multiplexer/demultiplexer 126 and then applied to the output port connected to office channel unit 125. The data bytes on the upstream paths of branches BR2, BR3 and BR4 of multipoint junction unit 129 are processed in the same manner as the data on branch BR1 recalling that only one station can send upstream at a time.

The downstream data on two-way trunk 108 from branch BR4 is passed to multiplexer/demultiplexer 133 in hub office 109. Multiplexer/demultiplexer 133 distributes the data to its various output ports and, specifically, applies the data on the downstream path of branch BR4 of junction unit 129 to the main line of multipoint junction unit 134. Multipoint junction unit 134, in turn, splits the data into downstream paths of two branches, the two paths extending to input ports of multiplexer/demultiplexer 135. Multiplexer/demultiplexer 135 inserts the data into two time slots on two-way trunk 110. This data is then passed downstream to local office 111 and, more specifically, to multiplexer/demultiplexer 136. Since the data is in two separate time slots, multiplexer/demultiplexer 136 applies the data to two separate output ports, which ports extend to office channel units 138 and 137. Each office channel unit, in turn, converts the data bytes to appropriate line signals for transmission to stations 112 and 113, respectively.

Line signals traveling upstream from station 112 or 113 are transmitted to the connected one of office channel units 138 and 137, respectively. The line signals are converted to data bits, assembled into data bytes and applied to the connected one of the input ports of multiplexer/demultiplexer 136. Multiplexer/demultiplexer 136 inserts the data bytes from the office channel units into the appropriate time slots on two-way trunk 110. The bytes pass upstream on trunk 110 to multiplexer/demultiplexer 135, which distributes the data bytes in each time slot to a corresponding one of its output ports. The output ports are connected to upstream paths of the two branches of multipoint junction unit 134 and multipoint junction unit 134, in turn, combines the data on the two upstream branches and applies this data to an input port of multiplexer/demultiplexer 133. The upstream data bytes are therefore inserted in a time slot on two-way trunk 108 and passed upstream to multiplexer/demultiplexer 132, which distributes the data bytes to an output port which is connected to the upstream path in branch BR4 of multipoint junction unit 129. Multipoint junction unit 129 combines the data bytes in the upstream paths of the several branches, as previously described, and sends the data via connector 151 to the control location.

The multiplexed downstream data from branches BR2 and BR3 of multipoint junction unit 129, which is inserted into two time slots on two-way trunk 114, is passed to multiplexer/demultiplexer 142 in local office 115. Multiplexer/demultiplexer 142 applies the data bytes in the two separate time slots on trunk 114 to two separate output ports, which ports extend to office channel units 144 and 143, respectively. Each channel unit, in turn, converts the data bytes to appropriate line signals for transmission to stations 116 and 117, respectively.

Line signals traveling upstream from station 116 or station 117 are transmitted to the connected one of office channel units 144 and 143, respectively. The line signals are converted to data bits, assembled into data bytes and applied to input ports of multiplexer/demultiplexer 142. The multiplexer/demultiplexer inserts the data bytes into appropriate time slots on two-way trunk 114. The bytes pass upstream on trunk 114 to multiplexer/demultiplexer 140, which distributes the data bytes in each time slot to a corresponding one of its output ports. These output ports, as previously described, are connected to upstream paths of branches BR2 and BR3. The data bytes are thus combined by multipoint junction unit 129 and sent on to the control location.

In large networks of the type shown in FIG. 1, it is customary to provide supervisory or control signals within the network for various "housekeeping" functions. These functions include, for example, testing, controlling and monitoring the condition of the various lines, loops and trunks and the various circuits and components within the network. A set arranged to provide for testing and controlling the various lines, loops and trunks and the various circuits and components in the network is shown in hub office 101 and is identified as signaling unit 150. Typical equipment for signaling unit 150 includes keyboard controlled code generators for sending appropriate bytes which are transmitted downstream to select and control lines and branches and further includes recording and display circuits for receiving, recording and displaying byte responses returned upstream by the selected lines and branches. Certain of these bytes are designated control bytes and differ from data and address bytes insofar as a "0" bit is written into the eighth bit position. It is to be noted that during normal modes (other than test modes when signaling unit 150 is testing components), control bytes may be transmitted upstream by various branches and units to identify conditions thereat, such as idle and out-of-service conditions.

In the normal mode, the multipoint junction unit is arranged to be transparent to all data bytes, going upstream or downstream, as previously discussed, with the exception that two different data bytes simultaneously going upstream on two separate branches will be combined and thus create errors. In addition, in the normal mode, a control byte traveling upstream is converted by the multipoint junction unit to a data byte having all "1" bits to eliminate interference with a signaling branch. Finally, in the normal mode, the multipoint junction unit is transparent to control code bytes going downstream.

The multipoint junction unit is arranged to go into the test mode in response to a predetermined sequence of control bytes coming downstream from signaling unit 150. In this test mode, the multipoint junction unit initially blocks all of the downstream paths of the branches extending therefrom and thereafter unblocks a branch selected by a control code byte transmitted downstream from signaling unit 150. This selected branch is rendered transparent to all data and control bytes, going both upstream and downstream, and all transmission to and from the unselected branches is blocked. An "end of test mode" control code byte from signaling unit 150 restores the multipoint junction unit to its normal mode.

Advantageously, branches may be selectively blocked to preclude any upstream and downstream data transmission by way of the blocked branch while the junction unit is in the normal mode. To selectively block a branch, signaling unit 150 sends the sequence of control bytes that place the multipoint junction unit in the test mode. Thereafter signaling unit 150 selects the branch to be blocked in the same manner described above rendering the selected branch transparent to data and control bytes. A "block" control code byte is then sent by unit 150 to place the selected branch in the "blocked" mode or state. Signaling unit 150 then restores the multipoint junction unit to its normal mode. All the unselected branches are thereby restored to normal. The previously selected branch, however, remains in the blocked state, permitting normal data transmission through all but the previously selected and now blocked branch. To clear the blocked branch, signaling unit 150 again places the multipoint junction unit in the test mode and again selects the blocked branch to cancel the "blocked" state. The "end of test mode" byte restores all the branches to normal.

In accordance with a preferred arrangement, signaling unit 150, each multipoint junction unit, such as multipoint junction unit 129, and remote components in the network have the capability of intercommunicating with at least ten different bytes, which are referred to as test bytes. These test bytes are summarized as follows:

| Byte Identification | Function |
| --- | --- |
| Test Alert (TA) | Control byte which initiates any test sequence. |
| MJU Alert (MA) | Advises multipoint junction unit that testing is to proceed by way of the unit. |
| Branch 1 (BR1) | Branch BR1 selection code. |
| Branch 2 (BR2) | Branch BR2 selection code. |
| Branch 3 (BR3) | Branch BR3 selection code. |
| Branch 4 (BR4) | Branch BR4 selection code. |
| All 0's | Control byte that indicates completion of selection sequence. |
| Idle | Downstream control byte which indicates end of test mode. Upstream control byte for idle branch. |
| HUB Identification (HID) | Identification of the hub; normally transmitted by hub multipoint junction unit. |
| Block (BL) | Control byte which instructs multipoint junction unit to block the selected branch. |

Prior to the initiation of the test mode, connector 151 is operated to switch the two-way connection of multipoint junction unit 129 from the ports on multiplexer/demultiplexer 128 to signaling unit 150. An attendant at signaling unit 150 initiates the testing sequence by operating the keyboard to enable the code generators to send the TA control byte to main line BR0 of junction unit 129. Multipoint junction unit 129, in response thereto, goes to a preliminary test mode and blocks all the branches. In addition, the multipoint junction unit returns the TA control byte back to signaling unit 150, advising it that the multipoint junction unit has gone to this test mode. The signaling unit continues the test sequence by sending the MA byte. Multipoint junction unit 129, in response thereto, returns the HID byte to signaling unit 150 for display thereat to identify the multipoint junction unit (and the corresponding hub office) in the test mode. It is to be noted that the multipoint junction unit will return to its normal mode if it does not receive the MA byte immediately following the TA byte. This safeguard protects against improper recognition of the TA byte and the safeguard is further useful in downstream junction units, on branches of unit 129, in the event that the TA byte should be repeated to a branch before it is blocked.

The branch selection byte identifying the branch to be selected is now transmitted by signaling unit 150 and multipoint junction unit 129 prepares to unblock this branch. At the same time, the multipoint junction unit returns the branch selection code byte to signaling unit 150 for display thereat to identify the branch to be selected. Signaling unit 150 now sends the All "0's" control byte and, at multipoint junction unit 129, the selected branch is unblocked, rendering it transparent to both data and control codes in both directions and the junction unit is rendered unresponsive to any subsequent selection codes. All other branches remain blocked; no data can be transmitted either downstream or upstream through these blocked branches. Signaling unit 150 may now control, test or monitor networks or units connected to or downstream from the selected branch. At the termination of the testing, signaling unit 150 sends the Idle control byte to return all branches of multipoint junction unit 129 to the normal mode.

To selectively block a branch the multipoint junction unit is placed in the test mode by the TA and MA bytes. The branch selection byte is then sent by signaling unit 150 to select the branch and the All "0's" control byte renders the selected branch transparent. Signaling unit 150 now sends the BL control byte placing the selected branch in the blocked mode. Subsequent reception of the Idle byte by the multipoint junction unit restores the unselected branches to the normal mode. The previously selected branch, however, remains blocked. To cancel the blocking, the multipoint junction unit receives the sequence of the TA and MA bytes and the branch selection byte for the blocked branch. The All "0's" byte clears the blocked branch and the Idle byte restores all of the branches of the multipoint junction unit to normal.

In the event that it is desired to select branches of multipoint junction unit 134 in hub office 109, signaling unit 150 sends the branch selection byte BR4 and the All 0's byte after sending the TA and MA codes. This selects branch BR4, whereby signaling unit 150 can intercommunicate with data and control bytes with multipoint junction unit 134 by way of branch BR4, multiplexer/demultiplexer 132, trunk 108 and multiplexer/demultiplexer 133. Signaling unit 150 again sends the TA control byte placing multipoint junction unit 134 in the test mode and multipoint junction unit 134 returns the TA code byte. Signaling unit 150 sends the MA byte and multipoint junction 134 returns the HID byte. Signaling unit 150 now sends the appropriate branch selection byte to initiate the selection of the desired branch of multipoint junction unit 134. The branch selection code byte is returned by multipoint junction unit 134 and signaling unit 150 sends the All 0's control byte to complete the selection. The testing of the equipment connected to the selected branch of multipoint junction unit 134 now proceeds in the same manner as the testing of equipment connected to the selected branch of multipoint junction unit 129. At the termination of the testing, signaling unit 150 sends the Idle control code byte, returning all intervening multipoint junction units, such as multipoint junction unit 129 and multipoint junction unit 134, to their normal conditions.

If a branch in the downstream multipoint junction unit is to be blocked, signaling unit 150 selects the several branches in the successive junction units as described above until the branch to be blocked is placed in the transparent test mode by the All 0's byte. The BL control byte is now sent by signaling unit 150. In accordance with this invention all of the upstream junction units recognize that the selection code of a branch in a downstream junction unit has been sent and consequently ignore the BL control byte. The last multipoint junction unit, however, responds to the BL control byte by placing the selected branch in the blocked mode, thus the only selected branch in the blocked mode is the last downstream branch to be selected and this branch remains blocked when the tandem network is restored to normal by the Idle control byte. To cancel the blocking, the downstream branch must be again selected and the following All 0's byte clears the blocked branch. The Idle byte then restores the entire network to normal.

It is to be noted that, in the interchange of data bytes in a central office of the type disclosed in the above-identified reissue patent of A. C. Carney et al, various units repeat each byte five times (for example) to provide various advantages of flexibility, as disclosed in said reissue patent. Signaling unit 150 is, therefore, correspondingly arranged to repeat each byte five times (for example), utilizing substantially identical circuitry as the type disclosed in the Carney et al reissue patent. Each multipoint junction unit, therefore, receives each control byte a corresponding plurality of times and, in general, provides the above-described functions in response to the first byte of the plurality that is received and detected. With respect to the function of returning control bytes, the multipoint junction unit responds not only to the first byte received but responds to each subsequent byte, whereby each test byte returned by the multipoint junction unit is transmitted five times (for example) to render the signaling of the unit compatible with the signaling format of the office circuitry disclosed in the patent.

Figure 2A:
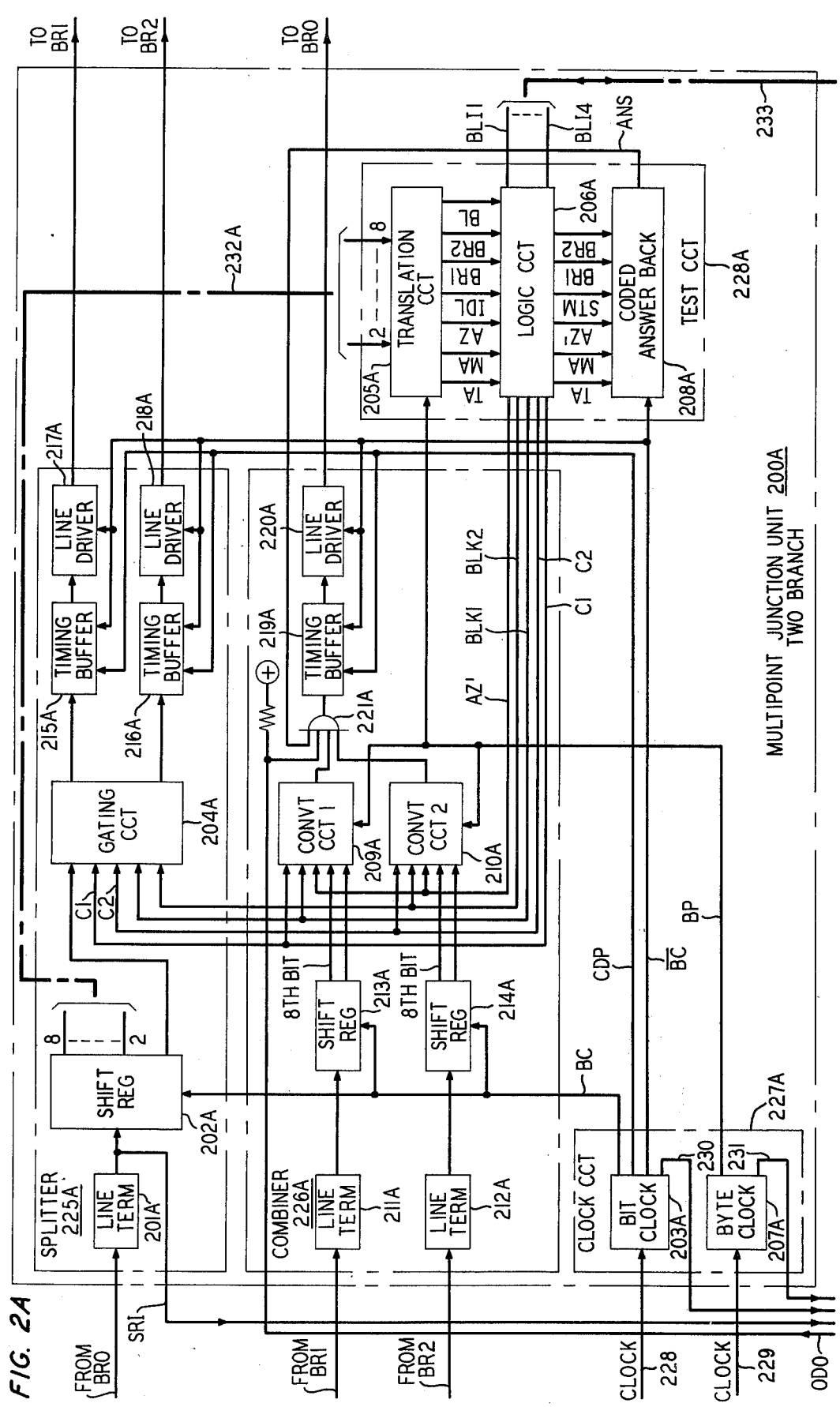
FIGS. 2A and 2B, when aligned vertically, show in schematic form the details of a four-branch junction unit in accordance with this invention.
Figure 2B:
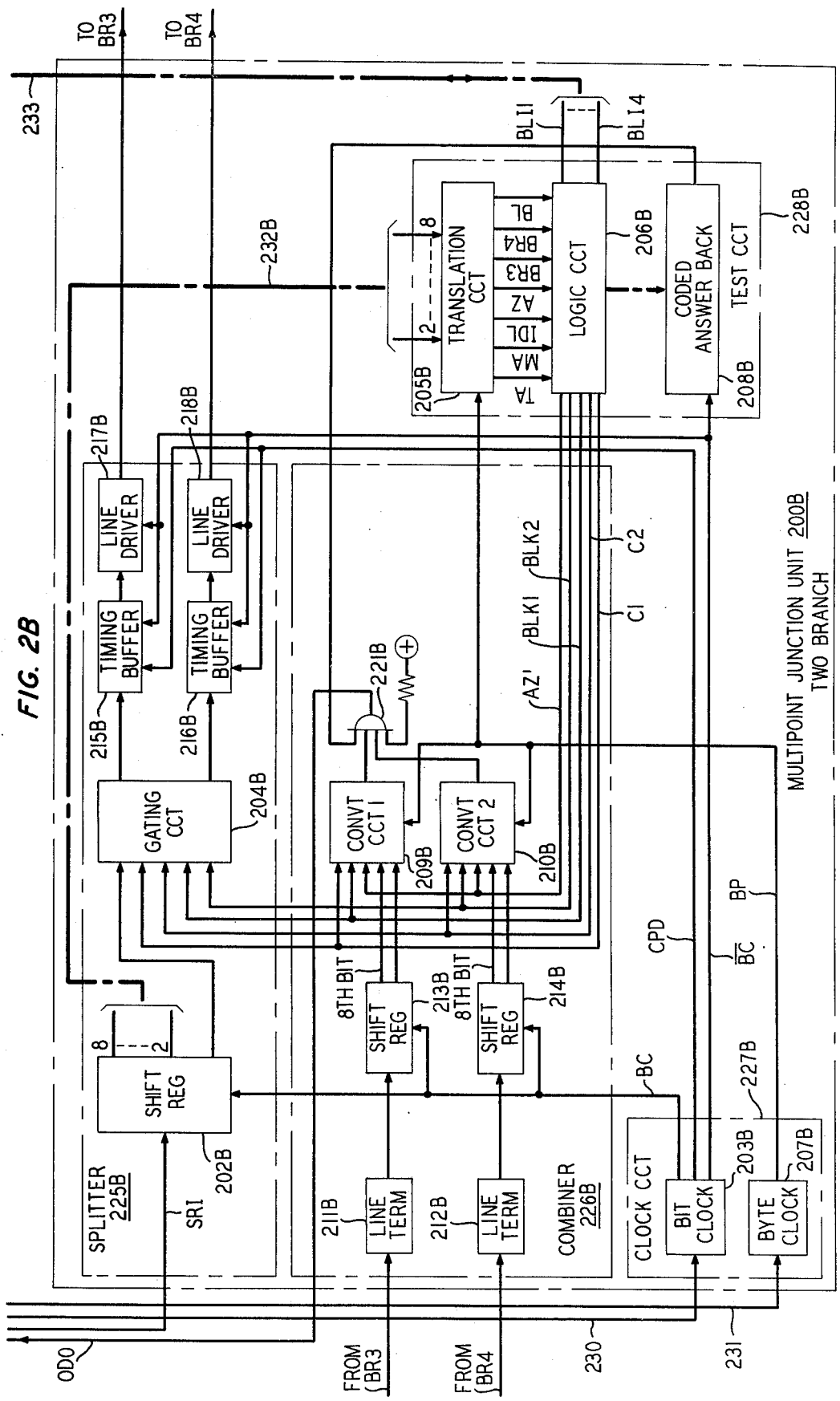

FIGS. 2A and 2B disclose a four-branch multipoint junction unit, such as multipoint junction unit 129. The four-branch multipoint junction unit consists of two two-branch junction circuits, identified as two-branch unit 200A, shown in FIG. 2A, and two-branch unit 200B shown in FIG. 2B. It is to be understood that a two-branch multipoint junction unit, such as unit 134, comprises one two-branch unit, such as unit 200A.

Each of the two-branch units is arranged in substantially the same manner, with minor exceptions which are pointed out hereinafter. In general, a two-branch multipoint junction unit consists of four major circuits identified in FIG. 2A as splitter 225A, combiner 226A, clock circuit 227A and test circuit 228A. The corresponding circuits in two-branch unit 200B are correspondingly identified as splitter 225B, combiner 226B, clock circuit 227B and test circuit 228B.

Input signals to two-branch unit 200A are provided by the upstream paths of branch BR1 and branch BR2, the downstream path of main line BR0 and incoming clock leads 228 and 229. Clock leads 228 and 229 extend to the office reference clock (not shown), deriving therefrom the bit clock and byte clock pulses, which are shown as timing waves A and B, respectively, in FIGS. 4A and 4B of the reissue patent of A. C. Carney et al and similarly shown as timing waves A and B in FIG. 4 of this application. These clock pulses are applied to clock circuit 227A and more specifically, the bit clock pulse on clock lead 228 is applied to bit clock circuit 203A and the byte clock pulse on clock lead 229 is applied to byte clock circuit 207A.

Broadly, it is the function of clock circuit 227A to develop appropriate timing pulses for the functioning of the multipoint junction unit in two-branch unit 200A. In addition, bit clock circuit 203A and byte clock circuit 207A repeat the bit and byte clock pulses on leads 228 and 229 and apply them to leads 230 and 231, respectively, for application to clock circuit 227B in two-branch unit 200B. Bit clock circuit 203A also repeats the bit clock pulse and applies it to lead BC. In addition, bit clock circuit 203A inverts the bit clock pulse and applies the inverted pulse, shown as timing wave C of FIG. 4, to lead BC. Finally, bit clock circuit 203A normally provides a high potential to lead CDP, lowering the potential in the event the office reference clock fails and the incoming bit clock pulse does not appear on lead 228 for a predetermined interval of time. Byte clock circuit 207A responds to the byte clock pulse by producing a narrow pulse following the trailing edge of the byte clock pulse, as shown in timing wave D of FIG. 4, which pulse is applied to lead BP.

The downstream data from control location 104 which is passed by way of main line BR0 to the multipoint junction unit, is applied to splitter 225A. The general function of the splitter, such as splitter 225A, is to repeat the incoming downstream bytes and apply them to the downstream paths of branches BR1 and BR2. In addition, when a branch is blocked the splitter applies the All 0's control byte to the branch.

The data on the upstream paths from branches BR1 and BR2 are applied to combiner 226A, it being recalled that data is normally received from one upstream branch at a time, the incoming signals on the other branch normally being an All "1's" data byte (line idle) or a control byte (such as the Idle control byte). A principal function of the combiner is to repeat incoming bytes from the active upstream branch and to apply the repeated bytes to the upstream path of main line BR0 through connector 151 to the control location. A second function of combiner 226A is to detect the eighth bit of each incoming upstream byte to determine if the byte is a control byte (eighth bit is a "0"). A third function of combiner 226A is to convert incoming bytes from an upstream branch to All "1's" data bytes. This results in suppressing the byte to thereby block the upstream branch. A final function of the combiner 226A is to accept "answerback" bytes from test circuit 228B and pass them to the upstream path of main line BR0.

When the multipoint junction unit is in the normal mode, with none of the branches blocked, test circuit 228A instructs combiner 226A (via leads C1, C2 and AZ') to repeat data bytes from an active upstream branch to branch BR0 and to block any upstream control bytes. In the normal mode, when a branch is placed in the blocked mode, test circuit 228A instructs combiner 226A (via leads BLK1 and BLK2) to block all upstream bytes on the blocked branch.

When the multipoint junction unit is in the test mode, test circuit 228A instructs combiner 226A to block all upstream bytes from unselected branches and to convert each byte from the blocked branch into an All "1's" data byte. The combiner repeats, without any conversion, all upstream bytes from a selected branch, making the multipoint junction unit fully transparent to the upstream data and control bytes on the selected branch.

Inputting to test circuit 228A consists of data, selection and control bytes derived from splitter 225A over cable 232A and timing signals on leads BP and BC. In general, test circuit 228A decodes the incoming bytes, determines when a test mode is to be initiated, generates the various "answerback" bytes, selects branches to be blocked or unblocked, and sets the multipoint junction unit in the test mode state.

The answerback bytes generated by test circuit 228A are applied to output lead ANS and passed to combiner 226A to be repeated to the upstream path back to the control location. Signals from test circuit 228A, which defines the blocked one or ones of branches BR1 or BR2, are passed by way of output leads C1, C2, BLK1 and BLK2 to combiner 226A and to splitter 225A. The indication defining whether control bytes are to be converted to All "1's" data bytes is passed by way of lead AZ' to combiner 226A. Finally, various signals, described in detail hereinafter, defining appropriate interrelationships of test circuit 228A in unit 200A and test circuit 228B in unit 200B, are exchanged by way of leads BLI1 through BLI4 and cable 233.

The circuit components for splitter 225A in two-branch unit 200A comprise line terminator 201A, shift register 202A, gating circuit 204A, timing buffers 215A and 216A, and line drivers 217A and 218A. Splitter 225B in two-branch unit 200B is arranged and operates in substantially the same manner as splitter 225A with the exception that it does not include a line terminator corresponding to line terminator 201A.

Downstream data bytes from main line BR0 are received by splitter 225A and applied to line terminator 201A. Line terminator 201A converts these incoming line signals to data bits and serially applies them to shift register 202A and to shift register 202B in splitter 225B by way of lead SR1.

Shift register 202A (and similarly shift register 202B) has a plurality of stages sufficient in number to store the eight bits of a data byte. The serial bits of each byte from line terminator 201A are shifted in and through the stages of shift register 202A by the bit clock pulses on lead BC. The data bits in each byte stored in the several stages of shift register 202A are read out in parallel through cable 232A to test circuit 228A. The data shifted into the final stage of shift register 202A is serially read out and applied to gating circuit 204A.

When multipoint junction unit is in the normal mode and none of the branches is blocked, enabling potentials are applied to gating circuit 204A by leads C1, C2, BLK1 and BLK2 and gating circuit 204A splits the serial bitstream applied thereto by shift register 202A by passing the stream to both of timing buffers 215A and 216A. If either or both of the branches (branches BR1 and BR2) are in the blocked state, test circuit 228A applies a disabling potential to gating circuit 204A via either or both of leads BLK1 and BLK2 as described hereinafter. If test circuit 228A applies a disabling potential to lead BLK1, gating circuit 204A blocks the serial data output of shift register 202A and applies "0" bits to timing buffer 215A thereby passing All "0's" bytes to branch BR1. Alternatively, if test circuit 228A applies a disabling potential to lead BLK2, gating circuit 204A applies All "0's" bytes to timing buffer 216A therefore blocking the data to branch BR2. Of course, if test circuit 228A applies disabling potentials to both leads BLK1 and BLK2, gating circuit 204A blocks the data stream passing to both branches BR1 and BR2. In the test mode, test circuit 228A applies a disabling potential to either or both of leads C1 and C2. If test circuit 228A applies a disabling potential to lead C1, gating circuit 204A blocks the serial stream and applies "0" bits to timing buffer 215A, thereby forming All "0's" bytes. Alternatively, if test circuit 228A applies a disabling potential to lead C2, gating circuit 204A applies All "0's" bytes to timing buffer 216A. Of course, if test circuit 228A applies a disabling potential to both leads C1 and C2, gating circuit 204A applies All "0's" bytes to both timing buffers.

Timing buffers 215A and 216A are arranged in substantially the same manner and normally function to retime and realign the serial bitstream under control of the bit clock pulses on lead BC. More specifically, the timing buffer provides a delay which, when added to the delay of shift register 202A, reestablishes the correct phase for each data byte. Timing buffers 215A and 216A are also arranged to block the serial bitstream applied thereto when a disabling potential is applied to lead CDP indicating that clock pulses are not being received by bit clock circuit 203.

The output bitstream of timing buffers 215A and 216A are passed to line drivers 217A and 218A, respectively. Each line driver retimes each bit under control of the clock pulses on the lead BC and repeats the bits to the downstream path of an outgoing branch. As seen in FIG. 2A, line driver 217A applies the bitstream to outgoing branch BR1 and line driver 218A applies the outgoing bitstream to outgoing branch BR2.

As noted above, splitter 225B is arranged and operates in substantially the same manner as splitter 225A. The outgoing bitstreams of splitter 225B are, of course, applied to downstream paths of branches BR3 and BR4.

The circuit components of combiner 226A comprise line terminators 211A and 212A, shift registers 213A and 214A, converters 209A and 210A, signal AND gate 221A, timing buffer 219A, and line driver 220A. Combiner 226B is arranged and operates in substantially the same manner as combiner 226A with the exception that it does not include a timing buffer and line driver.

Incoming upstream signals from branch BR1 are received by combiner 226A and applied to line terminator 211A. Similarly, incoming upstream signals from branch BR2 are applied to line terminator 212A. Each of line terminators 211A and 212A repeats the serial data bits of the data bytes to shift register 213A and 214A.

Each of shift registers 213A and 214A includes a plurality of stages sufficient in number to store the data bits of a data byte. The incoming data bitstream is shifted in and through the several stages of shift register 213A (and, similarly, shift register 214A) in response to shift pulses derived from lead BC. The serial outputs of the last stages of shift registers 213A and 214A are passed to converter circuits 209A and 210A, respectively. At the same time, the condition of the first stage and, therefore, the eighth bit of the data byte, is passed from each of shift registers 213A and 214A to converter circuits 209A and 210A.

In general, it is the function of each converter circuit, such as converter circuit 209A and converter 210A to repeat the serial bits of each byte passed thereto by the shift register, such as shift register 213A and shift register 214A, and pass the byte to AND gate 221A or alternatively to convert each byte to an All "1's" data byte for application to AND gate 221A, the latter function resulting in the blocking of the upstream data coming from the associated branch, such as branch BR1 and BR2. In providing these functions the converter circuit is controlled by potentials on leads C1, C2, BLK1, BLK2 and AZ', which potentials are developed by test circuit 228A and by the potentials provided by the eighth bit of each byte, as detected by the first stage of the shift registers, such as shift register 213A. Advantageously, the converting and repeating functions of each converter circuit is provided by standard logic gate circuitry, such as latch and NAND circuitry.

When the multipoint junction unit is in the normal mode and none of the branches is blocked, enabling potentials are applied to leads C1, C2, BLK1, BLK2 and AZ'. The converter circuit, such as for example, converter circuit 209A, reads the bit in the first stage of shift register 213A occurring concurrently with the byte timing pulse on lead BP, which bit indicates the condition of the eighth bit of the byte. If the eighth bit is a "1" bit, the "1" bit is latched in converter circuit 209A. The enabling potential on lead AZ' applies this "1" bit to the NAND circuitry enabling the NAND circuitry to repeat the data stream from shift register 213A to AND gate 221A. If, however, the eighth bit is a "0" bit, indicating that the upstream byte is a control byte, a "0" bit is latched by converter circuit 209A and this "0" bit is applied by the enabling potential on lead AZ' to the NAND gate circuitry resulting in the NAND gate converting the incoming data bytes to All "1's" data bytes. Accordingly, in the above-described normal mode, data bytes are passed to signal NAND gate 221A and control bytes are converted to All "1's" data bytes.

If the multipoint junction unit is in the normal mode and branch BR1 is in the blocked mode, a disabling potential is applied to lead BLK1. This (low) disabling potential is passed to the NAND gate circuitry in converter circuit 209A which thereupon converts all upstream bytes to All "1's" data bytes. Accordingly, upstream data from branch BR1 is blocked when a disabling potential is passed to lead BLK1.

When the multipoint junction unit is in the test mode, lead AZ' has a disabling potential applied thereto and either or both of leads C1 or C2 having diabling potentials applied thereto. If a (low) disabling potential is applied to lead C1, the NAND gate circuitry of converter circuit 209A blocks the data output of shift register 213A by applying All "1's" data bytes to signal AND gate 221A. In the event that branch BR1 is the selected branch, lead C1 (and lead BR1) has an enabling potential applied thereto. The disabling potential on lead AZ' renders the NAND gate circuitry nonresponsive to bits latched by converter circuit 209A. Accordingly, the NAND gate circuitry in converter circuit 209A repeats the output bitstream of shift register 213A without regard to the condition of the eighth bit of each byte making the multipoint junction unit transparent to both upstream data and upstream control bytes from branch BR1.

Converter circuit 210A operates in substantially the same manner as converter circuit 209A with the exception that it responds to the signaling potentials on leads BLK2 and C2. The output of converter 210A is also passed to an input of signal AND gate 221A.

Other inputs to signal AND gate 221A comprise the answerback data bytes generated by test circuit 228A and applied to lead ANS and the output bitstream of combiner 226B applied to lead ODO. Only one of the inputs to AND gate 221A can be providing data or control bytes other than the All "1's" data byte, all other inputs being blocked. The incoming bitstream on this unblocked input is passed through AND gate 221A to timing buffer 219A which delays and retimes the signal under control of the clock pulses on lead BC or blocks the signal in response to a disabling potential on lead CDP. The output of timing buffer 219A is passed to line driver 220A. Line driver 220A is controlled by clock signals on lead BC and repeats the bits for application to the upstream path of main line BR0.

As previously noted, combiner circuit 226B is arranged and operates in substantially the same manner as combiner circuit 226A, with the exception that it does not include a timing buffer, such as timing buffer 219A and a line driver, such as line driver 220A. The output of the signal AND gate identified as gate 221B is applied directly to output lead ODO which, as previously described, is passed to an input of signal AND gate 221A.

The principal components of test circuit 228A comprise translation circuit 205A, logic circuit 206A and coded answerback circuit 208A. The bits of the incoming bytes applied to splitter 225A and passed, in parallel, through cable 232 to test circuit 228A, as previously described, are applied to translation circuit 205A. It is noted that these bits constitute bits 2 through 8, the first bit not being significant to identify the byte. Translation circuit 205A provides conventional translation functions when operated by the pulse on lead BP which, as previously described, is derived from the byte clock pulse. The translation functions comprise recognition of various bytes and, in response thereto, momentary energization of corresponding ones of output leads.

The codes recognized by translation circuit 205A and the output leads thereby energized are summarized below:

| Byte Identification | Output Lead Energized |
|---|---|
| Test Alert (TA) | TA |
| MJU Alert (MA) | MA |
| Idle | IDL |
| All 0's | AZ |
| Branch 1 (BR1) | BR1 |
| Branch 2 (BR2) | BR2 |
| BLOCK (BL) | BL |

The several output leads of translation circuit 205A extend to inputs of logic circuit 206A. In general, logic circuit 206A is controlled by the energization of the various output leads of translation circuit 205A to place the two-branch multipoint junction unit and the two branches in various operating modes; to provide enabling of coded answerback circuit 208A to generate the several answerback bytes; and to intercommunicate with test circuit 228B in two-branch unit 200B, for purposes described hereinafter. In the normal mode, logic circuit 206A applies enabling potentials to leads C1, C2, BLK1, BLK2 and AZ'.

Coded answerback circuit 208A is arranged to generate answerback bytes, as determined by the energization of leads from logic circuit 206A, and to serially apply the bits of the bytes to lead ANS under control of the pulses on lead $\overline{BC}$. More specifically, coded answerback circuit 208A is enabled to generate an answerback byte so long as enabling potentials are on output leads STM and AZ', the particular byte generated being determined by leads TA, MA, BR1, BR2 and BLOCK, as further described hereinafter.

Test circuit 228B in two-branch multipoint junction unit 200B is arranged in substantially the same manner as test circuit 228A, with the exception that the translation circuit 205B therein is arranged to recognize the branch BR3 and branch BR4 selection codes and coded answerback circuit 208B generates bytes which differ in one respect from the bytes generated by answerback circuit 208A, as further described hereinafter.

Assume now that a test sequence is initiated by the remote signaling unit 150. This first byte of the sequence is the TA control byte. As previously described, the control byte is received by splitter 225A and the bits of the byte are passed by way of cable 232 to translation circuit 205A. Translation circuit 205A, upon the application of the timing pulse on lead BP, momentarily energizes output lead TA. Logic circuit 206A, in response thereto, energizes output lead STM, momentarily energizes output lead TA and applies disabling potentials to leads C1 and C2. The application of the disabling potentials to leads C1 and C2 blocks branches BR1 and BR2, as previously described. The energization of lead STM, with lead AZ' normally energized, enables coded answerback circuit 208A and in response to the momentary energization of lead TA, coded answerback circuit 208A generates the sequence of bits corresponding to the TA control byte and serially applies these bits to output lead ANS for applicaton back upstream. At the same time, the TA control byte is received by splitter 225B and recognized by translation circuit 205B and logic circuit 206B, in response to this recognition, applies disabling potentials to output leads C1 and C2 to block branches BR3 and BR4. However, the coded answerback circuit 208B does not generate any answerback to TA.

The next code byte in the test sequence from signaling unit 150 is the MJU Alert (MA) byte. Translation circuit 205A, in response to this byte, momentarily energizes lead MA and logic circuit 206A responds thereby by momentarily energizing its output lead MA. Logic circuit 206A maintains energized output lead STM and maintains the disabling potentials on leads C1 and C2. Branches BR1 and BR2 remain blocked and coded answerback circuit 208A is enabled to generate a hub identification (HID) control byte, serially applying the bits of the byte to lead ANS for transmission back to signaling unit 150. Test circuit 228B provides no function at this time with the exception that disabling potentials are maintained one output leads C1 and C2, keeping branches BR3 and BR4 blocked.

After signaling unit 150 receives the hub identification byte, the branch selection code byte is transmitted to select the appropriate branch. Assuming the branch BR1 selection code byte is transmitted, translation circuit 205A momentarily energizes output lead BR1. Logic circuit 206A, in response thereto, stores the indication that the branch BR1 byte has been received and momentarily energizes its output lead BR1. Lead STM is maintained energized and coded answerback circuit 208A generates and returns to signaling unit 150 the branch BR1 selection code byte via lead ANS. Similarly, if a selection code for another branch is transmitted at that time, the appropriate logic circuit (logic circuit 206A or logic circuit 206B) stores the indication thereof and operates the associated coded answerback circuit to return the corresponding selection code to signaling unit 150. In addition, the logic circuit storing the indication applies appropriate potentials to a selected one of leads BLI1 through BLI4 to advise the other logic circuit that a branch selection code has been received and the indication thereof has been stored. More specifically, upon the reception of the branch BR1 selection code, logic circuit 206A energizes lead BLI1 and logic circuit 206B is therefore advised of the storage of the branch selection code by logic circuit 206A. Similarly, other storage indications are interchanged by the logic circuits so that each logic circuit is advised when the other logic circuit has stored an indication that a branch selection code byte has been received.

After the branch selection code has been transmitted and the answerbacks received, signaling unit 150 sends the All "0's" byte. Translation circuit 205A (and translation circuit 205B) momentarily energizes output lead AZ. Logic circuits 206A and 206B are presently "primed" to recognize the momentary energization of input lead AZ by the prior storage of the indication of the reception of a branch selection code, it being noted that both logic circuits are so "primed" as a result of the intercommunication by way of leads BLI1 through BLI4. Primed logic circuit 206A (and logic circuit 206B) therefore applies a disabling potential to output lead AZ' and at the same time provides an enabling potential to an appropriate one of output leads C1 and C2, in accordance with the previously received branch selection code. This, as previously described, unblocks the selected branch and eliminates the converting function of the appropriate one of the converter circuits 209A, 209B, 210A or 210B, whereby the selected branch is enabled to transmit upstream both data and control bytes and signaling unit 150 is able to transmit downstream to the selected branch.

The disabling potential on lead AZ', which extends to coded answerback circuit 208A, disables the coded answerback circuit to preclude the generation of further answerback signals. Thus, the selected branch is rendered transparent to data and control bytes in both directions and signaling unit 150 can selectively communicate with the branch to control or test units connected to the branch, for example, or to send additional sequences to select a branch further downstream, but in series with the selected branch.

At the termination of the communication, signaling unit 150 sends the Idle control byte. The translation circuit momentarily energizes output lead IDL and logic circuit 206A, in response thereto, returns to its initial condition. The energization of output lead STM is removed and enabling potentials are applied to output leads C1, C2 and AZ'. The multipoint junction unit and the branches thereof can now restored to the normal mode.

If a branch of a downstream multipoint junction unit is to be selected, signaling unit 150 sends the above-described byte sequence comprising the TA and the MA bytes followed by the branch selection code and the All "0's" byte to select and unblock a branch of the local junction unit. The TA and the MA bytes followed by the branch selection code for the downstream branch is now sent by signaling unit 150. The All "0's" byte is then sent by signaling unit 150. The translation circuit, such as translation circuit 205A at the local upstream multipoint junction unit, ignores this second byte sequence since a selection has been made at this unit, the end of selection byte (All "0's") has been received and the Idle has not yet been received. This second sequence, however, is transmitted into the selected branch (which is now fully transparent) and sent on to the downstream multipoint junction unit. This downstream junction unit in response to this second sequence selects the branch indicated by the branch selection code in the sequence, unblocking the downstream branch in both directions to data and control bytes. Thereafter, at the termination of the communication, signaling unit 150 sends the Idle control byte to return all the multipoint junction units upstream and downstream to the initial mode.

If a branch is to be blocked, the BL byte is sent by signaling unit 150 after it completes the selection sequence by sending the branch selection code and the All "0's" byte. Translation circuit 205A momentarily energizes output lead BL in response to the BL byte. Logic circuit 206A having previously selected a branch now places a disabling potential on an appropriate one of output leads BLK1 or BLK2 in accordance with the previously received branch selection code. This, as previously described, blocks the selected branch, eliminating the transmission of data into or out of the selectively blocked branch. Signaling unit 150 now sends the Idle control byte, the translation circuit momentarily pulses lead IDL and logic circuit 206A in response thereto returns to its initial condition except for retaining the disabling potential on the selected ones of leads BLK1 or BLK2. The other unselected branches are therefore restored to the normal mode and the unselected branches thus may communicate with the main line in the normal manner. The blocked branch, however, is maintained in the blocked condition by logic circuit 206A.

To remove the blocked condition from the branch, signaling unit 150 again sends the byte sequence to select the blocked branch. Logic circuit 206A selects the blocked branch as previously described and when translation circuit 205A momentarily energizes lead AZ in response to the All "0's" byte, logic circuit 206A removes the disabling potential from the appropriate one of output leads BLK1 or BLK2. The subsequent Idle byte from signaling unit 150 restores the junction unit and all the branches to the initial normal condition.

If a downstream branch is to be blocked, signaling unit 150 first selects the branch extending to the downstream unit and then selects the branch to be blocked in the downstream unit in the same manner as previously described. As each multipoint junction unit selects and unblocks the appropriate branch, it simultaneously primes the junction unit to receive the BL code, as described above. When the second selection sequence is transmitted through the upstream junction unit to the downstream unit, however, the logic circuit 206A in response to the TA byte in the second selection code sequence renders it unresponsive to the BL code. Accordingly, signaling unit 150 sends the BL code after the second sequence selects the downstream branch and logic circuit 206A of the downstream unit responds to the BL byte by applying a disabling potential to the appropriate one of output leads BLK1 or BLK2. The upstream unit, which recognizes that a second subsequent selection code to select a branch at a downstream unit has been transmitted, ignores the BL code. Thus, only the branch at the downstream unit is blocked. The subsequent Idle control byte from signaling unit 150 restores all junction units to the initial normal state with the exception of the downstream unit which maintains the blocked branch in the blocked condition. The blockage on this branch can then be cancelled by successively reselecting the upstream branch and the downstream branch in the manner described above and then sending the All "0's" code to unblock this downstream branch. The Idle code then restores all junction units to the normal state.

Figure 3:
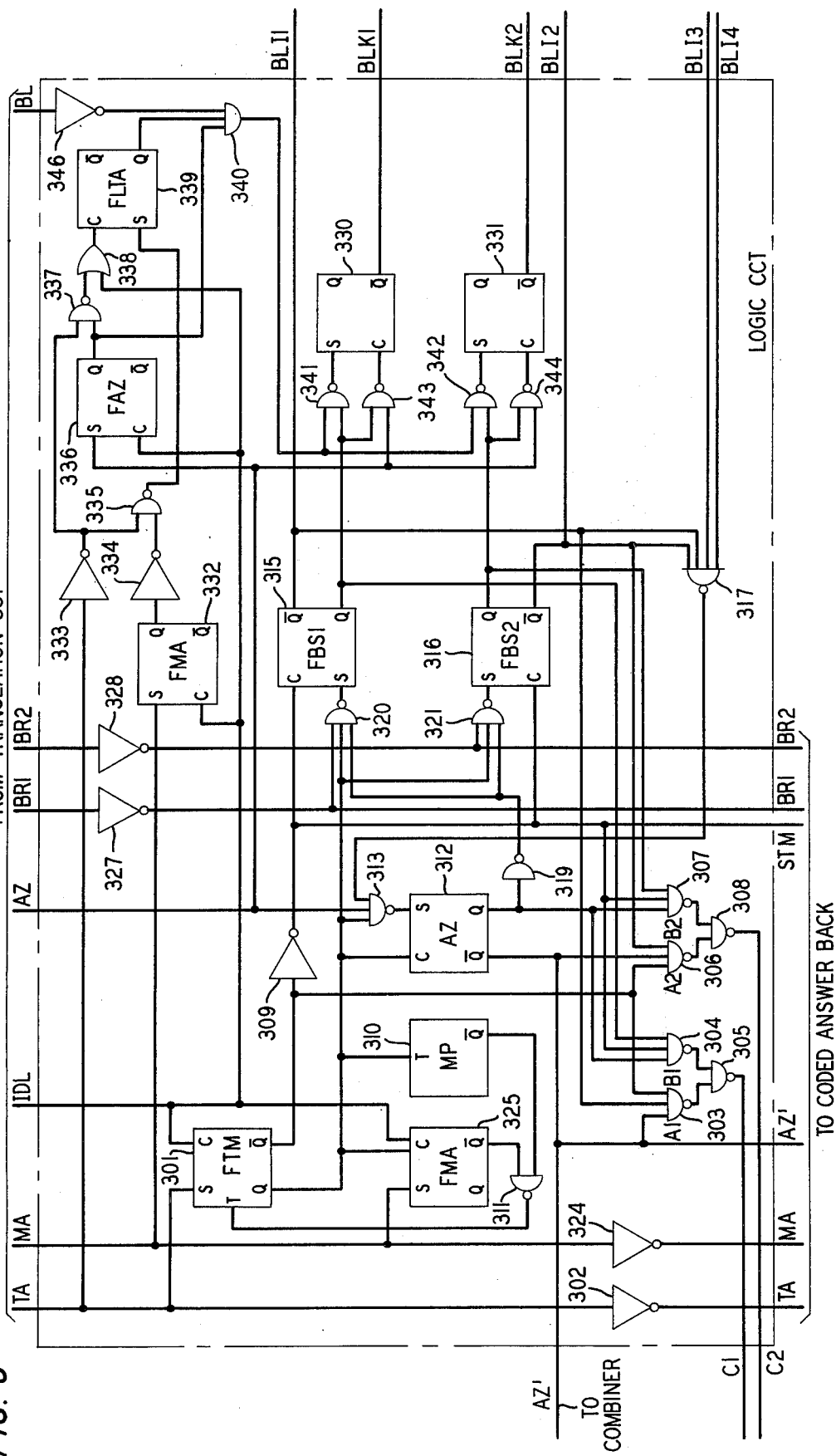
FIG. 3 shows details of a logic circuit suitable for use in the junction unit.

Refer now to FIG. 3 showing the details of a logic circuit, such as logic circuit 206A. With the logic circuit in the normal mode, all flip-flops therein are in the CLEAR state. Gates 303 and 306 are connected to various outputs of the several flip-flops, as described in detail hereinafter, and since all the flip-flops are CLEAR, the outputs of these gates are down. The output of gates 303 and 306 extend to an input of gates 305 and 308, respectively. As a consequence, the outputs of gates 305 and 308 are up, applying enabling potentials to leads C1 and C2. Since flip-flops 312, 330 and 331 are clear, leads AZ', BLK1 and BLK2 extending from the $\overline{Q}$ outputs of the flip-flops have enabling potentials thereon.

When the TA code is received, the translation circuit, such as translation circuit 205A, momentarily energizes its output lead Ta. Lead TA extends to the SET input of flip-flop 301 and to the input of inverter 302. The negative TA pulse sets flip-flop 301 and enables inverter 302 to momentarily energize output lead TA which extends to the coded answerback circuit. The setting of flip-flop 301 lowers the potential on output terminal $\overline{Q}$. This is inverted by inverter 309 to apply an enabling potential to lead STM. The coded answerback circuit is enabled by energized lead STM to generate the TA byte.

The pulse provided by the momentary energization of output lead TA is also passed by inverter 333. The resultant pulse is applied to NAND gate 335. NAND gate 335 is presently enabled by the low potential Q output of flip-flop 332 in the cleared condition, which low potential is inverted by inverter 334. The TA pulse inverted by inverter 333 is therefore passed through gate 335 to set flip-flop 339. The setting of flip-flop 339 partially enables AND gate 340.

With flip-flop 301 in the SET condition, the low potential on output terminal $\overline{Q}$ is applied to NAND gates 303 and 306. The outputs of gates 303 and 306 are therefore high. At this time the outputs of gates 304 and 307 are also high, since inputs thereof extend to the terminal Q output of flip-flop 312 (and, in addition, to the terminal Q outputs of flip-flops 315 and 316). As a consequence, the outputs of gates 304 and 307 are also high. Since the inputs of gates 305 and 308 are all high, the outputs thereof are low. This applies disabling potentials to leads C1 and C2 to block the branches, as described above.

The setting of flip-flop 301 also toggles monopulser 310 and monopulser 310 proceeds to time. After a predetermined interval monopulser 310 times out and, assuming the MA byte has not been received, a pulse is passed through NAND gate 311 to the TOGGLE input of flip-flop 301. This again clears flip-flop 301, restoring the logic circuit to its normal condition.

Under normal operating procedures the MA byte is received from signaling unit 150 before monopulser 310 times out. The translation circuit applies a pulse to input lead MA of the logic circuit and this pulse is passed to the SET input of flip-flop 325, to the SET input of flip-flop 332, and to inverter 324, which momentarily energizes output lead MA. Flip-flop 325 is set and disables gate 311, precluding the toggling of flip-flop 301 by the timeout of monopulser 310. Flip-flop 301 is therefore maintained in its SET condition by the timely arrival of the MA code byte, the enabling potential on lead STM is maintained and the MA control byte is generated by the answerback circuit.

The momentary energization on output lead MA is also passed to the set input of flip-flop 332. Flip-flop 332, when set, supplies a high potential at its Q output to inverter 334. This results in the application of a low potential to NAND gate 335 to disable the gate.

The branch selection code is now received and (assuming either branch BR1 and BR2 is to be selected) a pulse is passed through the appropriate one of inverters 327 and 328 and applied to gate 320 or 321. At this time, gates 320 and 321 are enabled by high potentials derived from the output Q terminal of flip-flop 301 and the output of inverter 319, which is inverting the low potential on the output Q terminal of flip-flop 312. The branch selection pulse is therefore passed through the appropriate gate (320 or 321) to set flip-flop 315 or flip-flop 316. At the same time, the branch pulse momentarily energizes output lead BR1 or output lead BR2.

Assume that the branch BR1 byte is received. Output lead BR1 is energized and the branch selection code is returned to the signaling unit. At the same time, flip-flop 315 is SET and a negative potential is provided to the output $\overline{Q}$ terminal, driving the output of gate 317 high. This, in turn, enables gate 313, "priming" the gate for the subsequent passage of the pulse on the AZ lead. In addition, the negative potential at the output $\overline{Q}$ terminal of flip-flop 315 is applied to lead BLI1 for application to the gate in the other logic circuit corresponding to gate 317, thus priming the other logic circuit in the same manner. Of course, if the branch BR2 selection code had been received, flip-flop 316 would have been SET, a negative energizing potential passed to output lead BLI2 and the output of gate 317 similarly driven high to enable gate 313.

If the branch BR1 byte is received and flip-flop 315 is consequently set, the positive potential provided to the output Q terminal is also passed to NAND gates 341 and 343. The NAND gates are thus enabled in the event that the BLOCK (BL) byte is received as disclosed hereinafter. If the branch BR2 selection code is received, flip-flop 316 would be set, the consequent positive potential from its output Q terminal enables NAND gates 342 and 344 in anticipation of the reception of the BL byte.

After all branch selection codes are sent, the All "0's" byte is transmitted. A pulse is applied by the translation circuit to lead AZ and passed through enabled gate 313 to set flip-flop 312. The setting of flip-flop 312 drives its output $\overline{Q}$ terminal low and this low potential is passed to output lead AZ' extending to the combiner and to correspondingly identified output lead AZ', extending to the coded answerback circuit. The converter circuit or circuits in the combiner associated with the selected branch or branches now cease to convert control bytes to an All "1's" byte and the answerback circuit is precluded from generating answerback bytes.

Flip-flop 312 also applies a high potential to output terminal Q, which potential is inverted by inverter 319 to disable gates 320 and 321. Therfore, the logic circuit will no longer recognize selection codes, such as codes in subsequent sequences which may be sent to select branches of downstream junction units. The high potential on the Q output of flip-flop 312 is also passed to gates 304 and 307. Since flip-flop 315 is SET by the branch BR1 selection code, all inputs to gate 304 are high and its output is low. The output of gate 305 is therefore high, applying an enabling potential to lead C1 to unblock branch BR1.

If branch selection code BR2 is received, flip-flop 316 is SET. When flip-flop 312 is SET, all inputs to gate 307 are high and the output of gate 307 therefore goes low, driving the output gate 308 high. This applies an enabling potential to output lead C2 to unblock branch BR2.

The reception of the All "0's" byte and the consequent pulse applied to lead AZ is also passed to the SET input of flip-flop 336. The setting of flip-flop 336 provides a positive potential at its output Q terminal, which potential enables NAND gate 337 and fully enables AND gate 340 since the gate was previously partially enabled by the setting of flip-flop 339.

The junction unit is now in the test state and intercommunication between signaling unit 150 and the selected branch (or branches) may now proceed or alternatively the BL byte may be sent to place the selected branch in the blocked mode. Assume first that signaling unit 150, after selecting the branch, communicates with a unit or units on the branch and then terminates the intercommunication. To terminate the intercommunicating, signaling unit 150 sends the Idle byte. The translation circuit pulses lead IDL and this clears flip-flops 301, 325, 332 and 336 and clears flip-flop 339 by way of OR gate 338. Flip-flop 301 upon being cleared, clears the operated one or ones of flip-flop 315 and 316 via inverter 309. Flip-flop 301 also clears flip-flop 312. The clearing of these flip-flops restores the enabling potentials on lead AZ′ and on leads C1 and C2 in the event that a disabling potential had previously been applied thereto. In addition, the clearing of these flip-flops removes any negative potential on intercommunication leas BLI1-BLI4 and removes the enabling potential on lead STN. This restores the logic circuit to its initial normal condition.

Assuming that a selected branch, such as branch BR1, is to be blocked, signaling unit 150 selects the branch in the same manner as previously described enabling flip-flop 315 to thereby enable NAND gates 341 and 343 and in response to the All "0's" byte enabling AND gate 340. To block the branch, signaling unit 150 sends the BL byte. The translation circuit pulses lead BL and this negative pulse is inverted by inverter 346 and passed to AND gate 340. AND gate 340 further passes the pulse through NAND gate 341 which was previously enabled and this passed pulse set flip-flop 330. The setting of flip-flop 330 applies a negative disabling potential to lead BLK1 and this potential is thus passed to the gating circuit, such as gating circuit 204A, and the converter circuit, such as converter circuit 209A, to block upstream and downstream communication on branch BR1. Similarly, if branch BR2 is to be blocked, signaling unit 150 selects this latter branch to enable NAND gates 342 and 344 whereby the pulse on lead BL provided in response to the BL byte is passed through NAND gate 342 to set flip-flop 331. A negative disabling potential is thereby applied to lead BLK2 to block upstream and downstream communication on branch BR2. Signaling unit 150 thereafter sends the Idle byte and, as described above, the translation circuit pulses lead IDL and the various flip-flops in the logic circuit are cleared. The set one of flip-flops 330 and 331 remain set, however, whereby the logic circuit is restored to a normal condition with the exception of either flip-flop 330 or 331 remaining set. The disabling potential is maintained therefore on lead BLK1 or BLK2 and communication over branch BR1 or BR2 remains blocked. The restoration of the other flip-flops in logic circuit removes all the other disabling potentials on leads AZ′, C1 and C2 whereby the other branches may communicate in the normal mode, that is, send data upstream and downstream with upstream control bytes being blocked.

Signaling unit 150 cancels the blocked mode of the blocked branch by reselecting the branch to thereby set either flip-flops 315 or 316. The subsequent transmission of the All "0's" byte pulses lead AZ to complete the selection as described above. In addition, the AZ pulse is passed through the enabled one of NAND gates 343 and 344. The set one of flip-flops 330 and 331 is thereby cleared removing the disabling potential applied to either lead BLK1 or BLK2. The subsequent Idle byte from signaling unit 150 now restores the logic circuit to its normal condition since the set one of flip-flops 330 and 331 has been cleared.

If the signaling unit desires to select a branch in a downstream junction unit, it initially selects the branch in the upstream junction unit which extends to that downstream unit. Accordingly, as described above, a particular branch, such as branch BR1, is selected and the All "0's" byte is transmitted to apply an enabling potential to lead C1 to selectively unblock branch BR1 for upstream and downstream intercommunication of data and control bytes. Signaling unit 150 now sends a second sequence to selectively unblock the downstream branch. The initial bytes of the second sequence are the TA and MA bytes, which provide no function in the upstream logic circuit with respect to flip-flops 301, 325 and 332 since these flip-flops were set by the previous sequence. However, the TA pulse is now passed through inverter 333 and NAND gate 337 since NAND gate 337 was previously enabled by the setting of flip-flop 336 in response to the All "0's" byte of the prior selection sequence. This pulse passed through NAND gate 337 is applied through OR gate 338 to clear flip-flop 339. The clearing of flip-flop 339 now disables AND gate 340. The branch selection code followed by the All "0's" byte is now sent by signaling unit 150 to the downstream junction unit. At the upstream unit the branch selection pulse on lead BR1 or BR2 is passed through inverter 327 or 328. The pulse, however, is blocked by NAND gate 320 and 321 since flip-flop 312 was set by the prior sequence and a disabling potential is thereby applied to NAND gate 320 and 321 by inverter 319. In the event that signaling unit 150 desires to block the downstream branch selected by this sequence, the BL byte is now transmitted. At the upstream unit, the pulse on lead BL from the translation circuit is blocked by AND gate 340 since this gate has been disabled by the clearing of flip-flop 339, which flip-flop was cleared in response to the TA pulse developed by the second selection sequence. Accordingly, the BL byte does not block the selected branch in the upstream junction unit. Signaling unit 150 now sends the Idle byte which restores the upstream junction unit to its normal condition. The downstream unit will also be restored to its normal condition with the exception that the selected branch is in the blocked state.

To terminate the blocked state, signaling unit 150 first selects the branch in the upstream unit and then selects the branch in the downstream unit. The transmission of the All "0's" byte in the second selection sequence removes the blocked condition of the branch in the downstream unit. Signaling unit 150 then sends the Idle byte and this restores all of the junction units to their normal conditions.

In the multipoint junction unit disclosed above and shown in the drawings, the capabilities of unblocked branch lines are retained even though one of the branch lines has been blocked. These capabilities include selecting a branch other than the blocked branch and blocking the subsequently selected branch whereby two branches of the junction unit are blocked. These blocked branches than can be individually unblocked in the manner described above.

Although a specific embodiment of this invention has been shown and described, it will be understood that various modifications may be made without departing from the spirit of this invention.

We claim:

1. A data switching unit including means effective when the switching unit is in a normal state for interchanging signals between a main line and a plurality of branch lines and means responsive to an initial appearance of an address signal on the main line for placing the switching unit in a test mode state, said placing means including means for precluding the interchange of signals with all but a selected one of the branch lines identified by the address signal characterized by cancelling and blocking means effective when the switching unit is in the test mode state and responsive to an appearance of a control signal on the main line for cancelling the interchange preclusion with the branch lines and for blocking interchange of signals with the selected branch line whereby signals are interchanged between the main line and all but the selected branch line.

2. A data switching unit, in accordance with claim 1, wherein the interchanging means effective in the normal state includes means for broadcasting signals on the main line to the plurality of branch lines.

3. A data switching unit, in accordance with claim 1, further including means responsive to a subsequent appearance of an address signal on the main line for rendering the blocking means unresponsive to the main line appearance of the control signal.

4. A data switching unit, in accordance with claim 3, further including means for removing the blocking of the interchange of signals with the selected branch in response to an appearance on the main line of a restoration signal identifying the blocked branch.

5. A data switching unit, in accordance with claim 4, wherein the restoration signal includes the address signal identifying the blocked branch and a cancelling signal, and the removing means includes means responsive to the address signal for identifying the blocked branch and means jointly responsive to the identification of the blocked branch and the appearance of the cancelling signal for restoring the switching unit to the normal state.

6. A data communication system including a plurality of data switching units, each of the units including means for interchanging data signals between a main line and a plurality of branch lines and means responsive to an initial appearance of an address data signal on the unit main line for precluding interchange of data signals with all but a selected one of the unit branch lines identified by the address signal, an upstream unit having at least one of its branch lines connected to the main line of a downstream unit whereby, when a subsequent address data signal appears on the upstream unit main line, data signals are thereafter interchanged exclusively with a selected one of the downstream unit branch lines, each unit including blocking and removing means responsive to a control data signal on the unit main line for blocking the interchange of data signals with the selected branch line and removing the interchange exclusion for the unselected branch lines.

7. A data communication system, in accordance with claim 6, wherein at least the upstream unit further includes means responsive to the subsequent appearance of the address data signal on the main line for rendering the blocking means unresponsive to the control data signal.

* * * * *